United States Patent
Sigmon et al.

(10) Patent No.: US 8,347,820 B2
(45) Date of Patent: Jan. 8, 2013

(54) SYSTEM FOR FILLING AND DRAINING AN AQUARIUM

(76) Inventors: Gerald Wayne Sigmon, Bristol, TN (US); Sheila Y. Sigmon, Bristol, TN (US)

( * ) Notice: Subject to any disclaimer, the term of this patent is extended or adjusted under 35 U.S.C. 154(b) by 529 days.

(21) Appl. No.: 12/683,689

(22) Filed: Jan. 7, 2010

(65) Prior Publication Data

US 2011/0162584 A1     Jul. 7, 2011

(51) Int. Cl.
*A01K 63/04*     (2006.01)

(52) U.S. Cl. .................................. 119/259; 119/264

(58) Field of Classification Search .................. 119/245, 119/259, 264, 269; D30/106; 417/181
See application file for complete search history.

(56) References Cited

U.S. PATENT DOCUMENTS

| | | | |
|---|---|---|---|
| 2,112,290 A * | 3/1938 | Holland | 417/181 |
| 2,636,473 A * | 4/1953 | Schwartz et al. | 119/264 |
| 3,324,829 A | 6/1967 | Dosamantes de Jose at al. | |
| 3,785,342 A | 1/1974 | Rogers | |
| 3,827,560 A | 8/1974 | Morton | |
| 4,610,784 A * | 9/1986 | Reyniers | 210/167.23 |
| 4,817,561 A | 4/1989 | Byrne et al. | |
| 4,913,811 A | 4/1990 | Huang et al. | |
| 4,957,623 A | 9/1990 | Henzlik | |
| 5,160,431 A | 11/1992 | Marioni | |
| 5,690,054 A | 11/1997 | Allen | |
| 5,695,654 A * | 12/1997 | Schultz | 210/780 |
| 5,849,185 A | 12/1998 | Judy, Jr. | |
| 6,666,168 B2 | 12/2003 | Stutz et al. | |
| 7,107,633 B2 * | 9/2006 | Cummings, III | 4/661 |

* cited by examiner

*Primary Examiner* — Kimberly Berona

(57) ABSTRACT

A system for filling and draining an aquarium. An aquarium tank is fitted with a drain and fill system. An aquarium comprises a tank fitted with a drain line that connects to a sediment collector at a first end and terminates in a connector at a second end. Interposed between the first end and the second end and proximate to the first end is a diverter valve. Interposed between the second end and the diverter valve is a "T" connector that connects the drain line to a vertical fill line. The fill line extends to a height above the height of the tank and extends over the opening of the tank to facilitate the disposition of water into the tank. The cleaning of the tank may be performed by turning the diverter valve to an open position. Filling the tank may be performed when the diverter valve is in a closed position.

4 Claims, 4 Drawing Sheets

SYSTEM FOR FILLING AND DRAINING AN AQUARIUM

BACKGROUND

While the pleasures of owning an aquarium are many, cleaning the aquarium and changing the water are not among them. Cleaning is important to maintain the health of the fish living in the aquarium and to maintain the filter system in proper working order. Cleaning may involve siphoning or "vacuuming" the gravel and undergravel filter from the top of the tank, changing filters, and replacing the water with fresh water. These tasks can be messy, harmful to the fish living in the tank, and potentially harmful to the person performing the task.

Various systems have been proposed to make the cleaning process less onerous. These systems generally utilize a bottom drain to remove the waste and the water without siphoning and with minimal stiffing of the sediment that collects in the bottom of the tank. However, the drainage systems do not simplify the task of replenishing the water in the tank or provide control over the temperature or water quality of the replenishment water.

SUMMARY

Embodiments herein are directed to a system that permits convenient and efficient cleaning and refilling of an aquarium.

DETAILED DESCRIPTION

Figure 1:
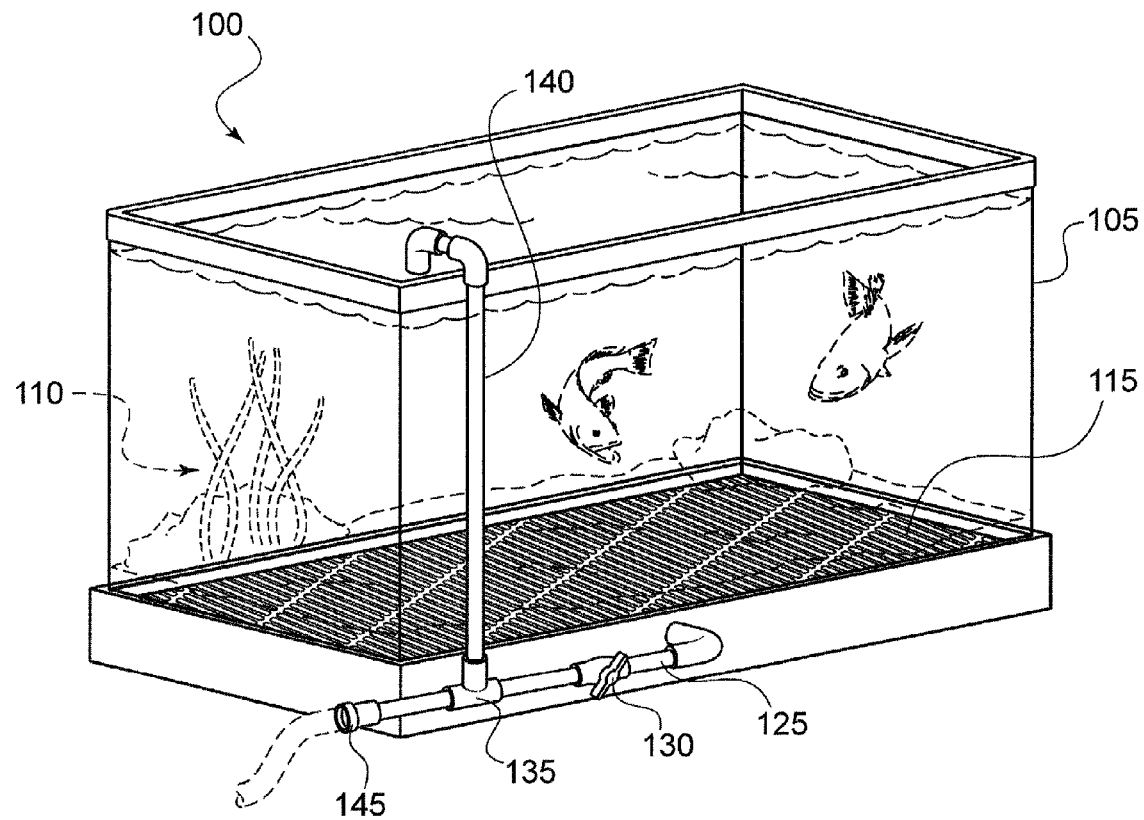
FIG. 1 is a pictorial representation of a fish tank configured with a fill and drain system according to an embodiment.
Figure 2:
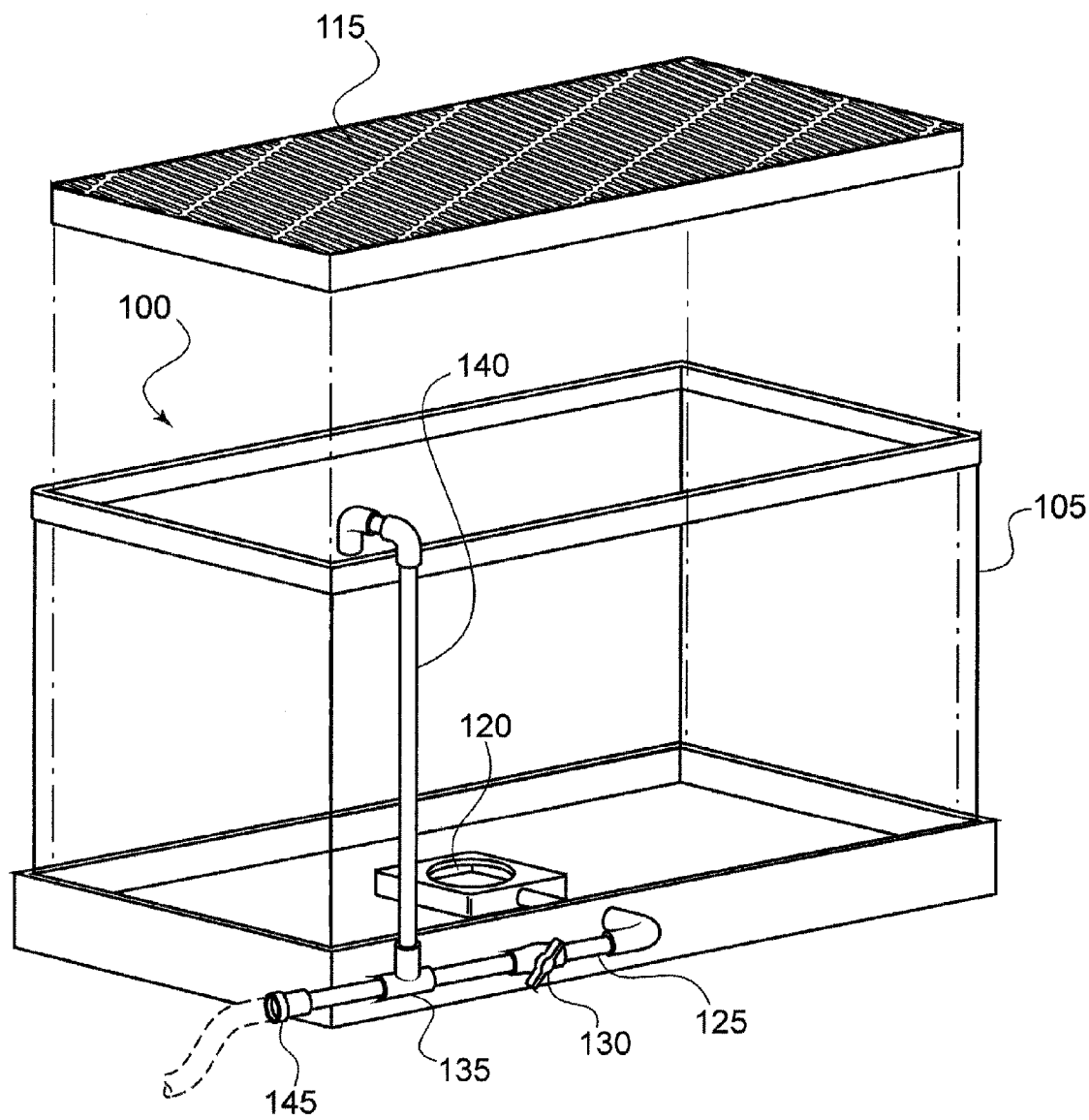
FIG. 2 is a pictorial representation of the components of a fill and drain system according to an embodiment.

Referring to FIGS. 1 and 2, an aquarium 100 comprises a tank 105 which is fitted with a filter screen 115. The tank 105 is also fitted with a drain line 125 that connects to a sediment collector 120 (illustrated in FIG. 2) at a first end and terminates in a connector 145 at a second end. Interposed between the first end and the second end and proximate to the first end is a diverter valve 130. Interposed between the second end and the diverter valve is a "T" connector 135 that connects the drain line to a vertical fill line 140. As illustrated, the aquarium 100 may further comprise scenery (or gravel) 110 that is supported by the filter screen 115.

The sediment collector 120 is open at the top and closed at the bottom. In an embodiment, the sediment collector 120 is attached to the bottom of the tank 105. In another embodiment, the "bottom" of the sediment collector 120 is formed by the bottom of the tank 105. As illustrated, the sediment collector 120 has a rectangular cross-section. However, this is not meant as a limitation. The shape of the sediment collector is not critical to its operation. Additionally, the figures are not to scale and the illustrated size of the sediment collector 120 relative to the size of the tank 105 is for clarity purposes only.

The fill line 140 extends to a height above the height of the tank 105 and extends over the opening of the tank to facilitate the disposition of water into the tank 105.

In normal operation, the diverter valve 130 is in a closed position. In this position, the water in the tank 105 does not enter the drain line 125. Debris 150 from food and from the marine life living in the tank may fall on the gravel or scenery. Gravity will pull this debris 150 on and through the filter screen 115. A portion of this debris 150 will be collected in sediment collector 120.

Figure 3:
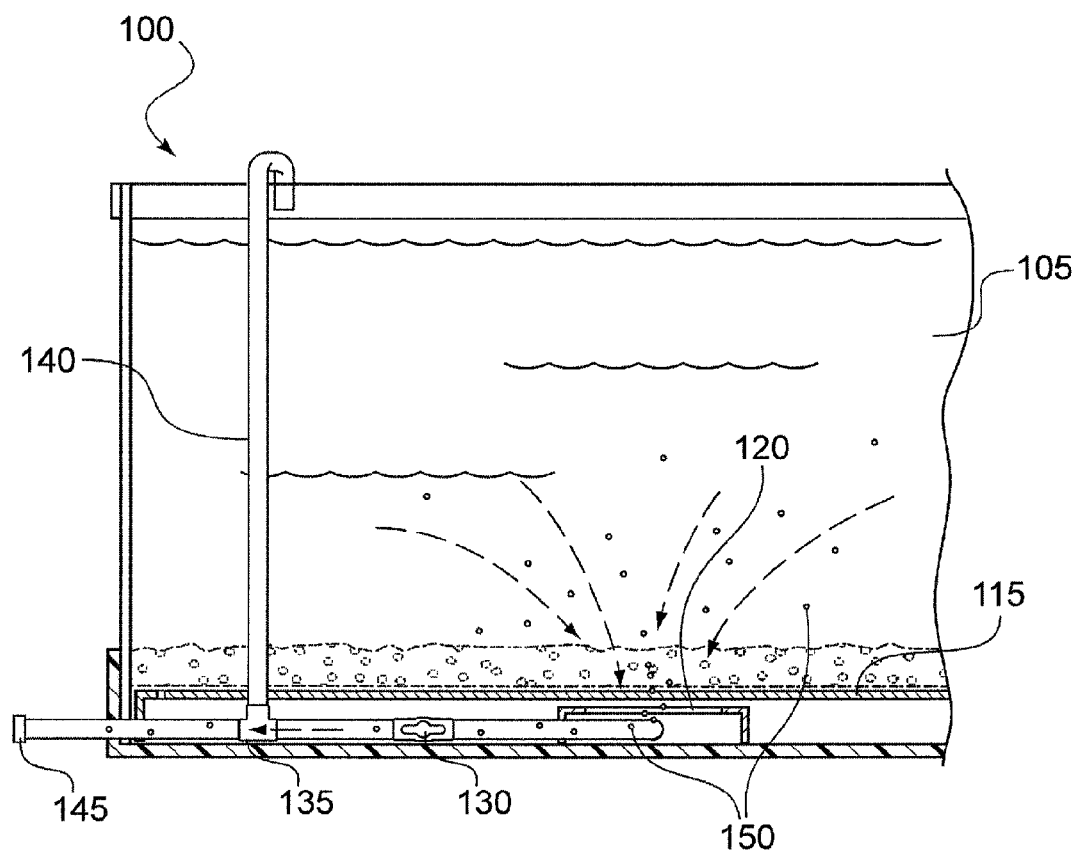
FIG. 3 is a pictorial representation of a fill and drain system operating in a drain mode according to an embodiment.

The cleaning of the tank may be performed by turning the diverter valve 130 to an open position. FIG. 3 illustrates the operation of the draining system in this mode. Water is drawn to the sediment collector 120. The current generated by this flow pulls the debris that has collected in the sediment collector 120 into the drain line 125. In addition, debris that has fallen on the scenery 110 and onto the filter screen 115 may be drawn to the sediment collector 120 and out the drain line 125. To facilitate disposal of the waste water from the aquarium 100, a hose (not illustrated) may be connected to the connector 145.

Figure 4:
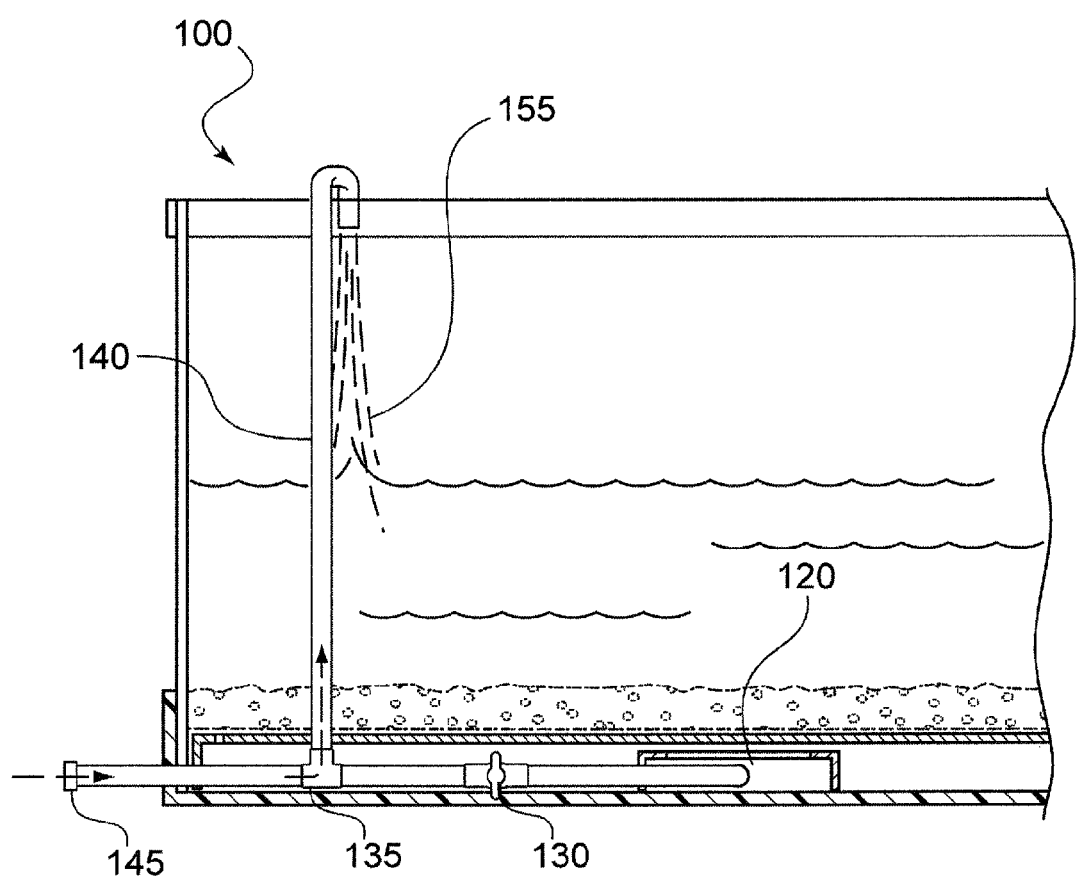
FIG. 4 is a pictorial representation of a fill and drain system operating in a fill mode according to an embodiment.

Filling the tank may be performed when the diverter valve 130 is in a closed position. FIG. 4 illustrates the operation of the filling system in this mode. In this mode, a source of clean water 155 is connected to the drain line 125 using the connector 145. Because the diverter valve 130 is in the closed position, the clean water 155 is directed to the fill line 140. The filling process is performed from the top of the tank. In an embodiment, the clean water 155 is conditioned prior to its introduction to the aquarium 100. By way of illustration and not by way of limitation, the clean water 155 may be conditioned as to temperature and its chemistry.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. An aquarium system comprising:
   a tank having a base, a pair of first sides, a pair of second sides, the first and second sides having a height all defining a main chamber;
   a sediment collector secured to the base of the tank, wherein the sediment collector has sides extending vertically from a bottom and a top supported by the sides, wherein the sides define a cavity that is accessible via an opening in the top, and wherein a drain opening is located in a side proximate to the bottom of the sediment collector;
   a drain pipe connected to the drain opening, the drain pipe exiting the tank proximate to the base of the tank and connected to a valve; and a first extension of the drain pipe connecting the valve to an inverted "T" connector, wherein the inverted "T" connector comprises a horizontal component and a vertical component, wherein the horizontal component is connected to a second horizontal extension of the drain pipe and wherein the vertical component of the inverted "T" connector is connected to a vertical fill line, wherein the vertical fill line extends vertically along a side of the fish tank and over the side of the fish tank.

2. The aquarium system of claim 1, wherein the valve is configurable to a closed position and wherein when the valve is in the closed position, the tank may retain a fluid supportive of marine life.

3. The aquarium system of claim 1, wherein the valve is configurable to a closed position and wherein when the valve is in the closed position, a fluid supportive of marine life may be introduced to the tank via the second horizontal extension and the vertical fill line.

4. The aquarium system of claim 1, wherein the main chamber is filled with a fluid supportive of marine life, wherein the valve is configurable to an open position and wherein when the valve is in the open position, the fluid may be drained from the tank via the first and second horizontal extensions.

* * * * *